United States Patent Office 3,348,583
Patented Oct. 24, 1967

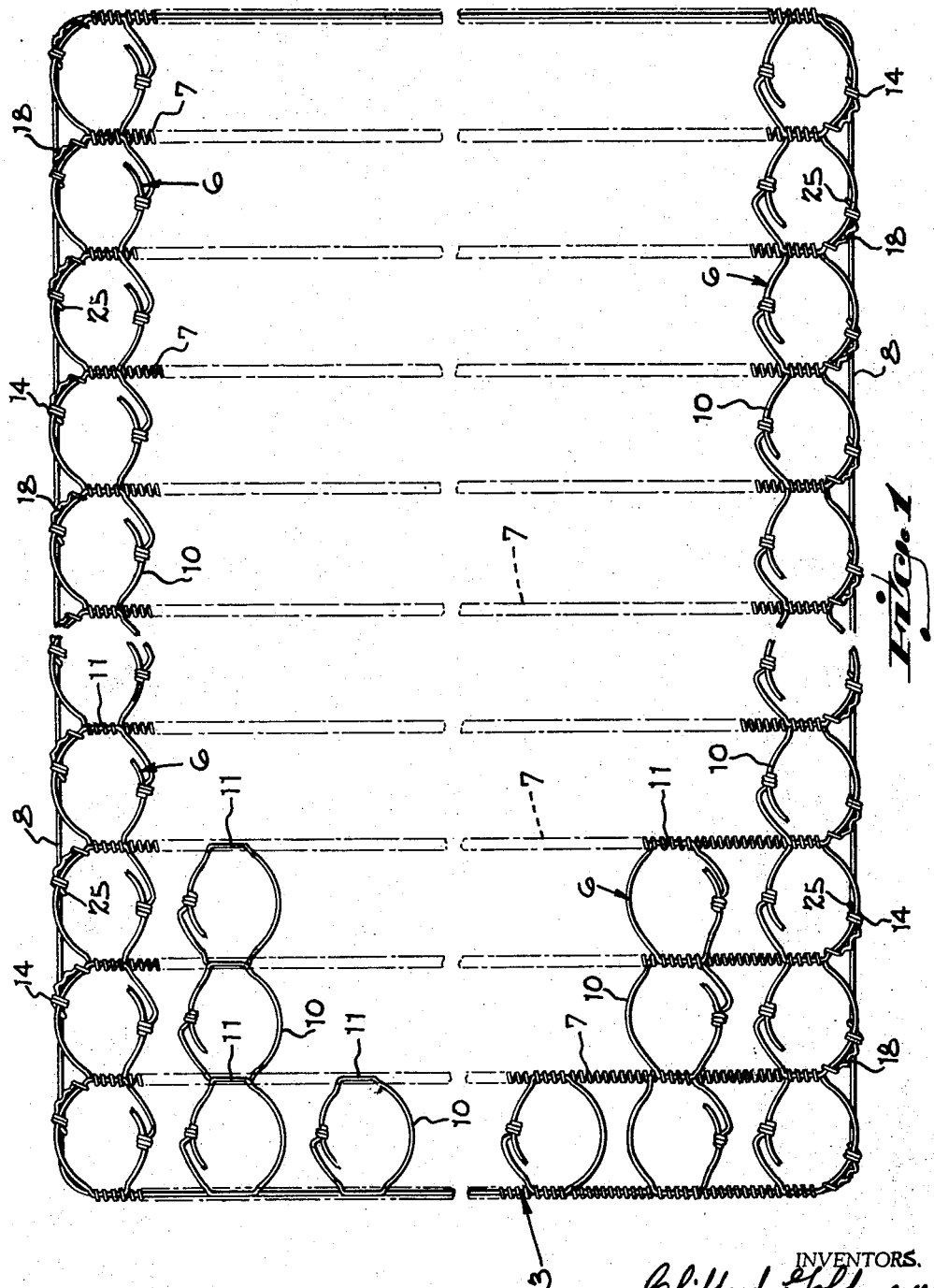

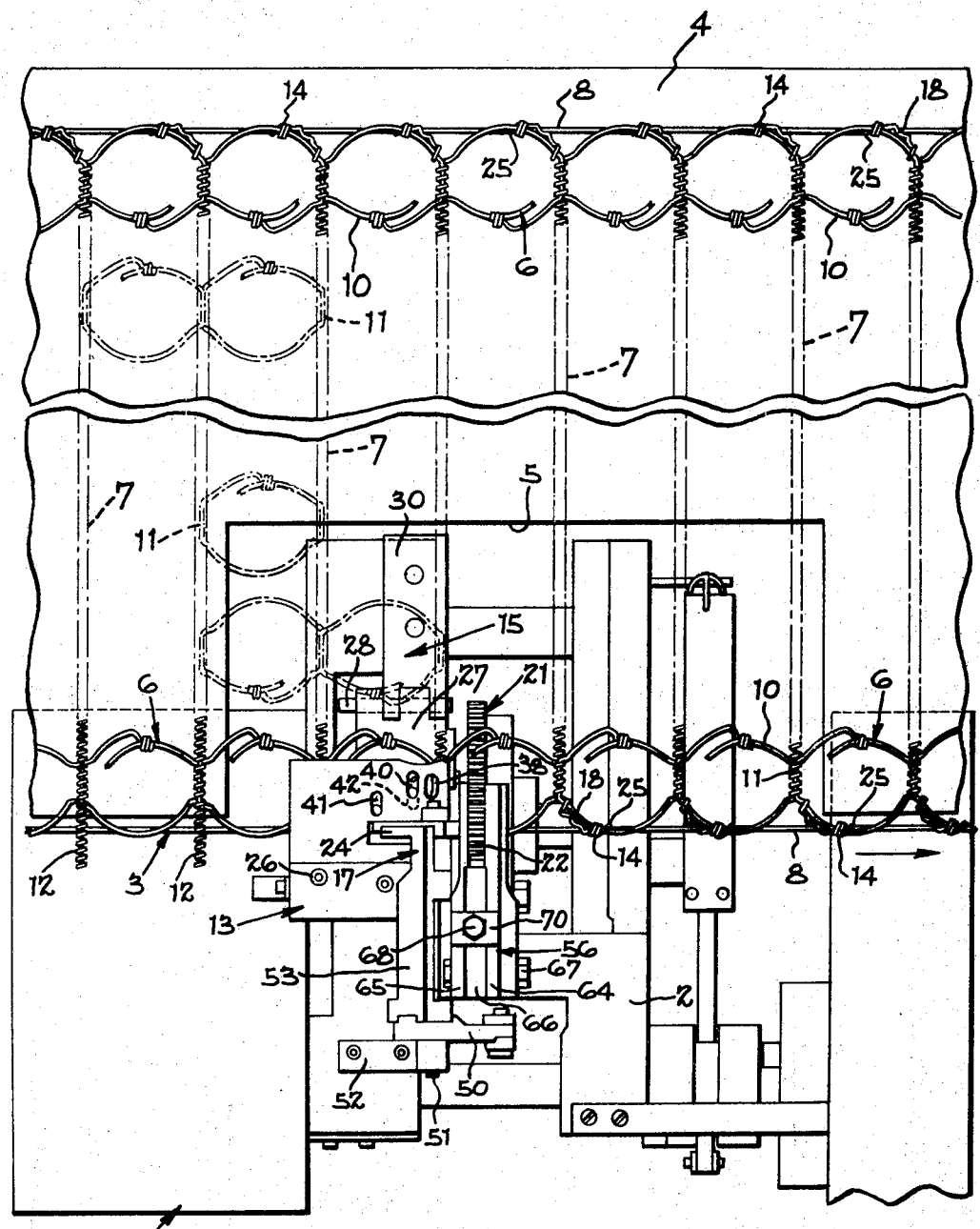

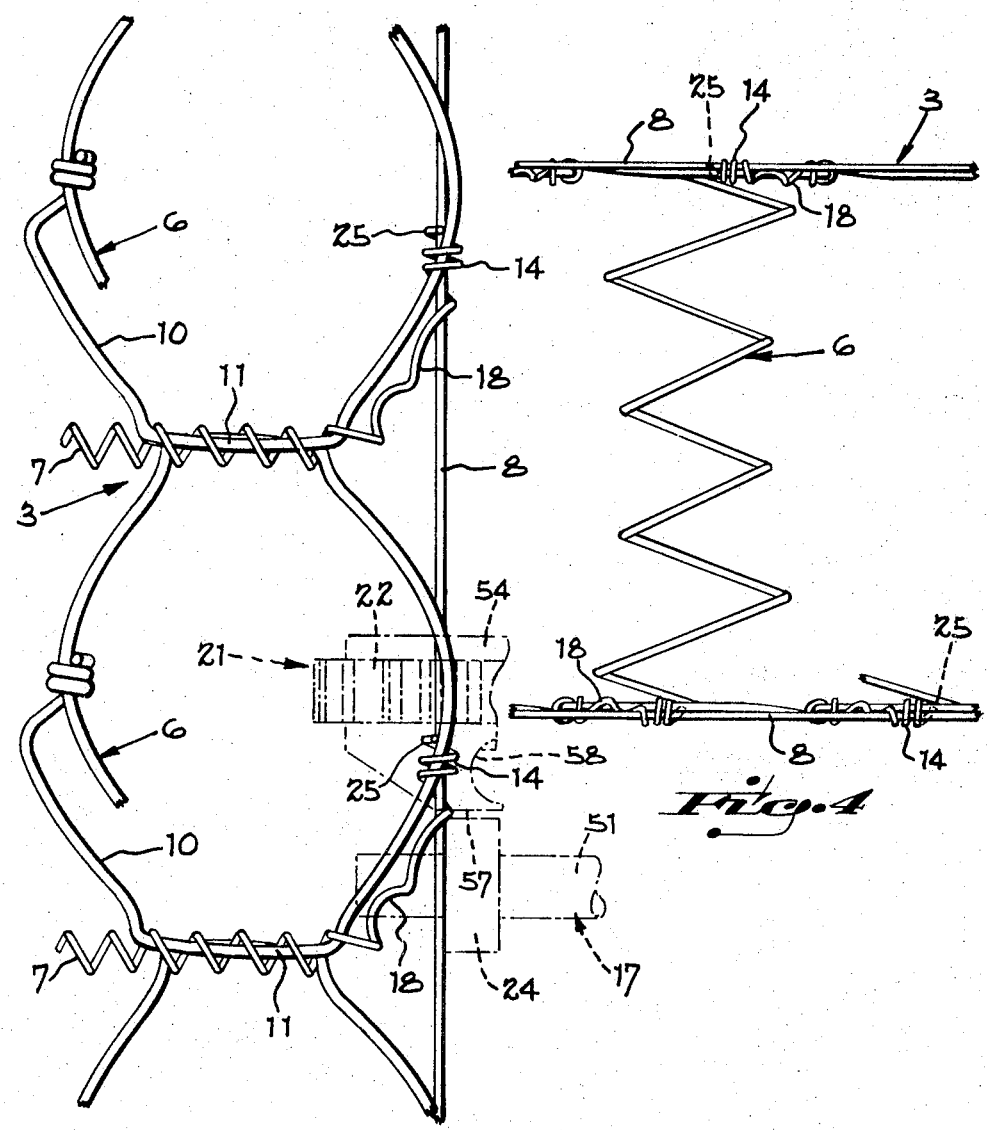

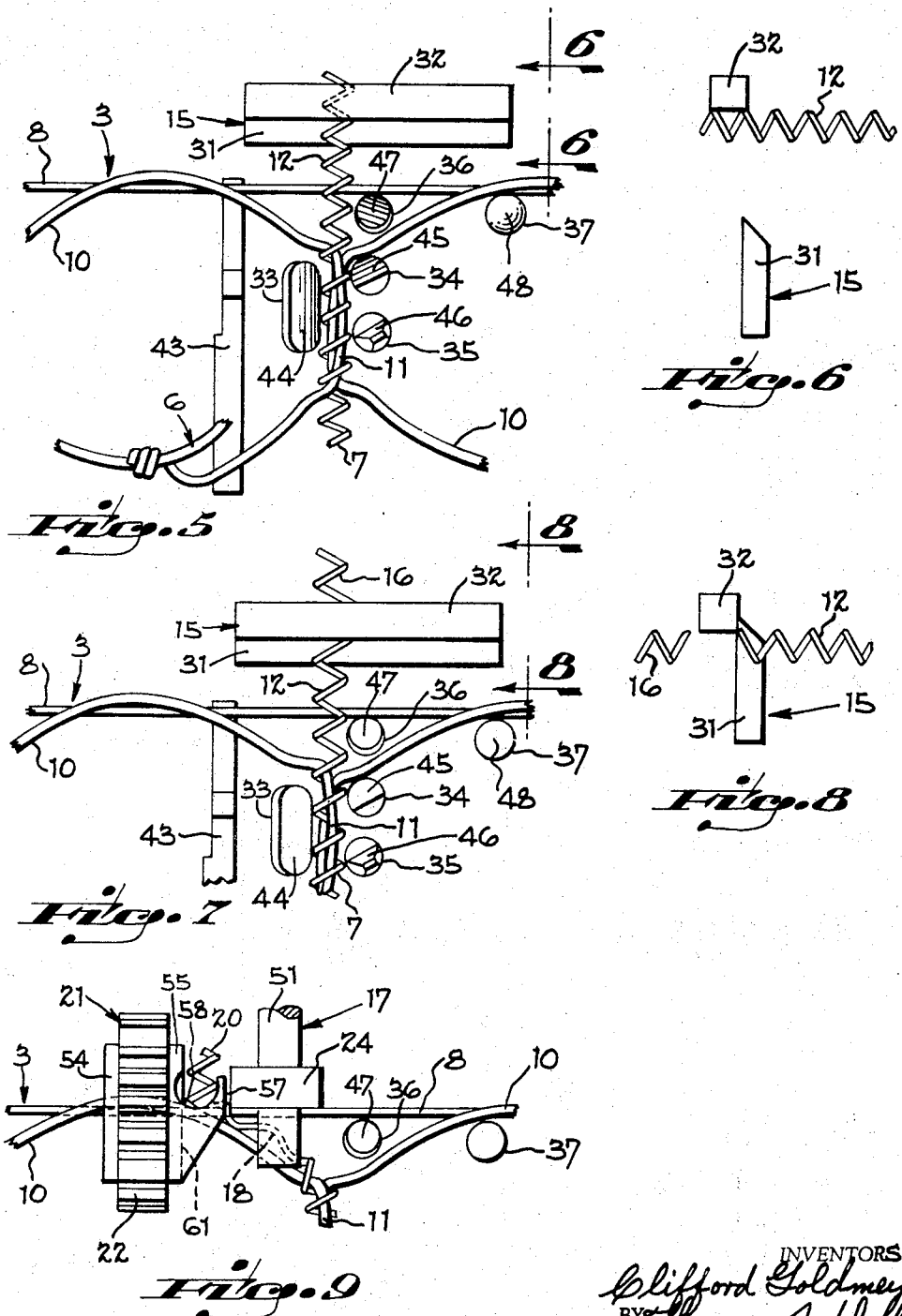

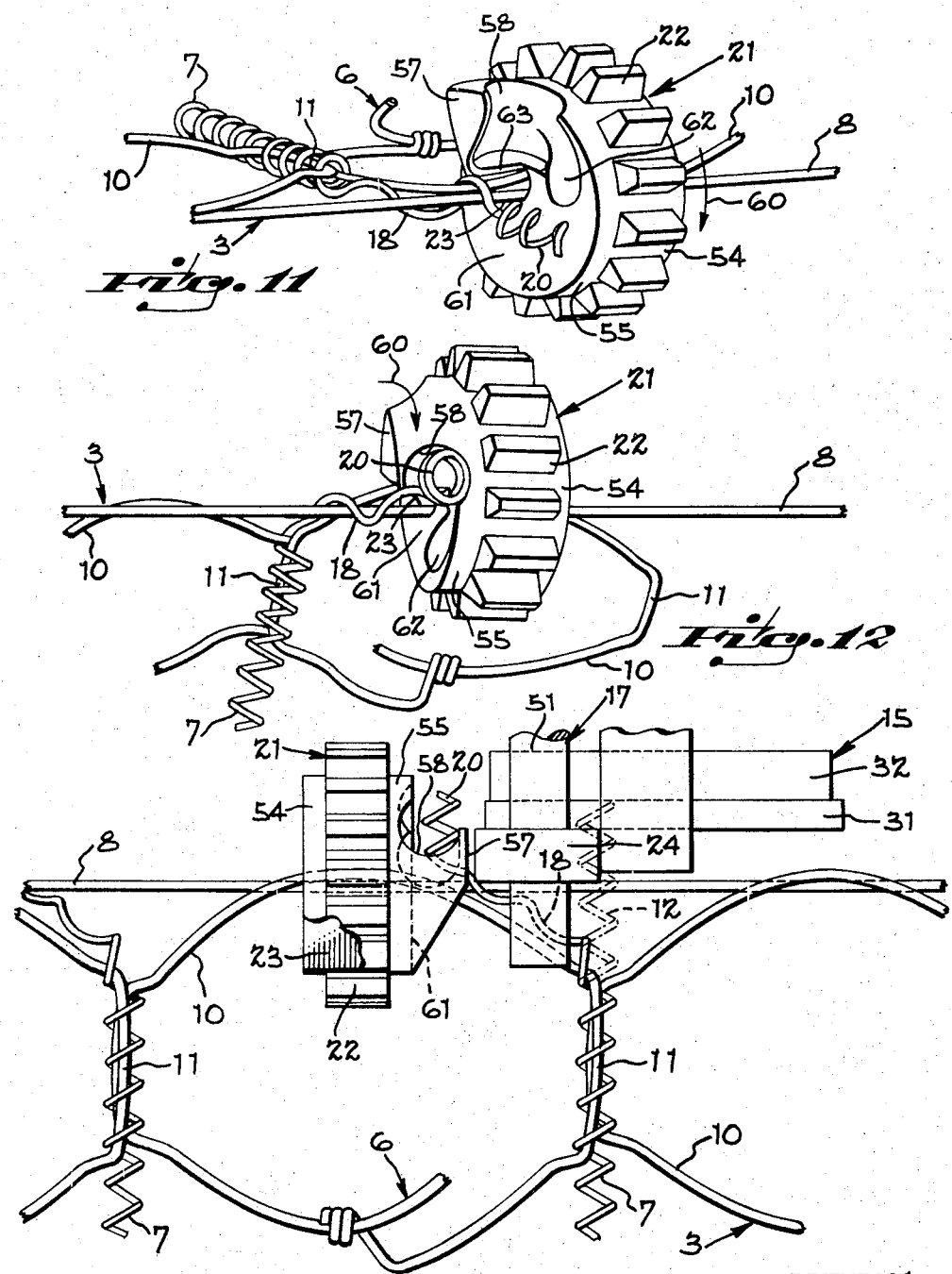

3,348,583
METHOD OF FABRICATING COIL
SPRING UNITS
Clifford Goldmeyer, Cincinnati, and Thomas J. Dull, Fairfield, Ohio, assignors to The J. R. Greeno Company, Cincinnati, Ohio, a corporation of Ohio
Application Oct. 2, 1964, Ser. No. 401,092, which is a division of application Ser. No. 339,638, Jan. 23, 1964, now Patent No. 3,316,944. Divided and this application Sept. 13, 1965, Ser. No. 495,747
4 Claims. (Cl. 140—92.4)

ABSTRACT OF THE DISCLOSURE

The invention resides in the method of joining the transverse rows of coil springs, to one another by threading individual helical wires in corkscrew fashion about the adjoining terminals of the transverse rows of coil springs, leaving an end portion of each helical wire projecting beyond the border wire at opposite sides of the spring unit. After the helicals are thus threaded in place, the projecting end portion of the helical at opposite ends is trimmed to a predetermined length, then the trimmed end portion is stretched lengthwise to a substantially straight condition. The stretched, substantially straight end portion of the helical is then bent generally at right angles to a position substantially parallel with the border wire, after which the end portion is wrapped about the marginal terminal and about the border wire itself, thus tying the marginal terminal to the border wire. After the wrapping operation the wrapped portion of the helical is tightened to provide a clamping engagement between the adjoining portion of the border wire and terminal to hold the terminal to the border wire against displacement and also to lock the helical against longitudinal displacement with respect to the spring unit.

This invention relates to coil spring units of the type used for mattresses, bed springs and the like. Spring units of this character comprise rows of coil springs joined together at the top and bottom by helical wires which are threaded in cork screw fashion about the adjacent portions of the terminals of the coil springs.

The present application is a division of the co-pending application of Clifford Goldmeyer and Thomas J. Dull for "Coil Spring Unit and Method of Fabrication," Ser. No. 401,092, filed on Oct. 2, 1964, now Patent No. 3,264,660. The divisional application (Ser. No. 401,092) in turn, was divided from an earlier application Ser. No. 339,638, filed on Jan. 23, 1964, now Patent No. 3,316,944.

As disclosed in the parent application, the end portions of the transverse helical wires, which are utilized to connect the upper and lower terminals of the rows of coil springs, are also utilized to connect the terminals to the upper and lower border wires which delineate the size and shape of the spring unit. In the past, this connection has required the use of separate connecting devices, such as metal clips or wires, applied in a separate operation to hingedly join the upper and lower terminals of the marginal coil springs to the border wire.

It is therefore one of the objectives of the present invention to provide an improved spring unit wherein the helicals, not only connect the top and bottom terminals of the rows of coil springs to one another but also connect the terminals of the marginal coil springs to the border wire at the top and bottom of the spring unit. By virtue of this construction, the use of the separate connecting devices, noted above, is eliminated and the resulting spring unit is improved.

Another objective of the invention has been to provide an improved method of wrapping the end portions of the helicals about the adjoining portions at the terminals and border wires, comprising the steps of trimming the end portion of each helical, stretching the trimmed end, and of wrapping the trimmed and stretched end portion about the adjoining portions of the terminal and border wire.

In utilizing the wrapping method of this invention, a spring unit is initially assembled by threading the helicals across the terminals of the coil springs, with opposite end portions of the helical projecting outwardly beyond the terminals at opposite sides. Upon being transferred to the wrapping machine, the border wire, the helical and marginal terminal are located and clamped in registry, then the wrapping machine engages the projecting end portion of each helical, trims it, stretches it, then wraps it about the adjoining portions of the terminal and border wire.

A further objective of the invention has been to provide a spring unit, having helicals securing the terminals to the border wires, wherein the end portion of each helical is wrapped under tension about the adjoining portions of the terminal and border wire, to securely anchor the helical and prevent longitudinal displacement of the helical after prolonged usage of the spring unit.

According to this aspect of the invention, the projecting end portion of each helical is trimmed to a predetermined length (as previously mentioned) prior to the wrapping operation. Upon being stretched, the helical, which extends between the terminal coils and border wire, is in a substantially straight condition, while several turns of the original helical remain unstretched at the end. The unstretched portion is then wrapped about the adjoining terminal and border wire and tightened to provide a clamping effect therebetween. The arrangement is such that the trimmed end of the helical, after the wrapping operation, resides within the confines of the marginal helical and border wire in a concealed position.

Further features and advantages of the invention will be more fully apparent to those skilled in the art from the following detailed description with reference to the drawings.

In the drawings:

FIGURE 1 is a plan, as viewed from above, showing the bottom border wire and lower terminals of a typical coil spring unit embodying the principles of the present invention.

FIGURE 2 is a fragmentary top plan view, generally illustrating the wrapping mechanism, with a portion of the spring unit in place within the machine to illustrate the wrapping method.

FIGURE 3 is a fragmentary plan view, detailing the arrangement of one of the terminal coils, with the end portion of the helical wrapped about the terminal coil and border wire at completion of the wrapping operation.

FIGURE 4 is a side elevation of the spring assembly, further illustrating the wrapped end portions of the upper and lower helicals which join the upper and lower terminals to the border wires.

FIGURE 5 is a diagrammatic plan view of a portion of the coil spring unit, showng the locating and helical cut-off mechanism in relation to the spring unit, the parts being shown in the position assumed at the beginning of a cycle.

FIGURE 6 is a diagram, as viewed along the line 6—6 of FIGURE 5, showing the lower cut-off knife in its lowered position at which it resides at the start of an operating cycle.

FIGURE 7 is a diagrammatic view similar to FIGURE 5, showing the lower cut-off knife in its elevated position at the beginning of the wrapping cycle.

FIGURE 8 is a diagram as viewed along line 8—8 of FIGURE 7, further illustrating the cut-off operation.

FIGURE 9 is a fragmentary top plan view similar to FIGURE 7, showing the stretching and guide finger shifted to the advanced position to stretch the end portion of the helical and to locate the stretched end portion within the wrapping gear at completion of the severing operation.

FIGURE 10 is a diagrammatic top plan view, further illustrating the stretching operation by means of which the trimmed end portion of the helical is stretched and located in position to be acted upon by the wrapping gear.

FIGURE 11 is a fragmentary perspective view, showing the wrapping gear at the begining of the cycle, corresponding to the position of FIGURE 9.

FIGURE 12 is a perspective view showing the wrapping gear as it begins to rotate at the beginning of the wrapping cycle.

Spring unit and general arrangement of the wrapping machine

The drawings disclose the pertinent portion of a helical wrapping machine, as disclosed in the prior application (Ser. No. 401,092), which has been found to best carry out the principles of the present invention. Referring specifically to FIGURES 1 and 2, the machine, in general, comprises a frame structure, indicated generally at 1, including legs (not shown) preferably formed of structural steel members. The legs have their upper ends joined to a rigid bed 2. The legs support the bed 2 and operating components of the machine at an elevation convenient to the operator.

The spring unit, which is indicated generally at 3 (FIGURES 1 and 2), is supported on a table 4 which extends in a horizontal plane rearwardly from the operating components of the machine. In the present example, the table is in the form of a sheet metal plate and is supported at the proper elevation by a support structure (not shown), which is joined to the frame structure 1. To provide clearance for the components of the wrapping mechanism, the forward edge portion of the table includes a cut-out portion 5 (FIGURE 2). As explained later, the portion of the spring unit 3 in the cut-out area 5 is supported with refernce to the components of the wrapping mechanism by a locating device which clamps the coil springs, border wire, and helical during the cycle of operation.

Described generally, the spring unit 3 is of the type used in mattresses, bed springs and the like. The spring unit comprises rows of coil springs indicated generally at 6 and joined together at the top and bottom by transverse helicals 7. The spring unit is bounded on all four sides by upper and lower border wires 8.

Each coil spring, in the present example, is generally of hour glass shape, as viewed from the side (FIGURE 4), with enlarged terminals 10—10 at the top and bottom. The terminals 10 lie in level planes and delineate the top and bottom surface of the spring unit. Each terminal 10 includes opposed straight portions 11 which mate with one another to facilitate the application of the transverse helicals 7 which are laced about the adjacent mating straight portions 11 at the top and bottom of each terminal.

In assembling, the spring unit 3, prefabricated coil springs 6 are located in row formation, the rows extending transversely across the width of the spring assembly, with the straight portions 11 of the terminals in mating relationship (FIGURES 1 and 2). Thereafter, the helicals 7 are located and advanced in cork screw fashion transversely across the spring assembly by means of a helical feeder (not shown). The transverse helicals 7 are thus laced about the mating straight portions 11, thereby to tie the joining rows of coil springs to one another. At completion of the lacing operation, an end portion of each transverse helical, as indicated at 12, projects outwardly beyond the border wire 8 (FIGURES 2, 5–8). The projecting portion 12 of the helical subsequently is utilized to tie the marginal terminals 10 to the border wire 8, as explained later.

An automatic machine for fabricating the spring unit to this stage is disclosed in the Greeno et al. Patent 3,045,714. According to conventional practice, by way of example, marginal terminals 10 have been connected to the border wires 8 by threading a longitudinal helical (not shown) upon the upper and lower border wires and terminals. In other instances, the terminals may be joined to the border wires by means of separate clips or individual tie wires.

While the spring assembly fashion in this manner is highly satisfactory, the transverse helicals 7 have a tendancy to be rotated through flexing of the spring unit after prolonged use, causing an end portion of the helical to project beyond the border wire at one side of the spring unit or mattress. In order to prevent this action, the ends of the helicals, according to the prior practice, may be deformed in some manner to prevent rotation. By way of example, the patent to John L. Greeno et al., 3,090,407, discloses a machine which forms a loop at opposite ends of the helical to prevent the unscrewing action.

As noted above, the present helical wrapping machine utilizes the projecting end portion 12 (FIGURE 2) to tie the terminal coils to the border wire. This arrangement thus eliminates the need for longitudinal border helicals, clips, tie wires or the like, thus bringing about a substantial saving in manufacturing costs and also in material. Moreover, the end portion 12 of the helical, when wrapped tightly about the terminal and border wire, firmly anchors the helical against axial displacement, thus eliminating the necessity of forming loops at the ends of the helicals, as noted above.

The helical wrapping machine, disclosed generally herein, is intended to form a part of the production line, and is adapted to receive the spring units as they issue from the assembly machine, such as disclosed in Patent 3,045,714. Thus, as the spring unit 3 is completed, it is transferred from the assembly machine to the table 4 of the wrapping machine.

Operation of machine in carrying out wrapping method

After being placed upon table 4, the spring unit 3 is advanced (in the present example by hand) toward the right as indicated by the arrow in FIGURE 2. In order to locate the helical 7 and terminal 10 in operating position, the machine is provided with a stationary locating head, indicated generally at 13 (FIGURE 2). As shown in FIGURE 2, several of the transverse helicals 7 to the right side of head 13 have been wrapped as at 14, the operation being carried out with respect to the individual helicals as the spring unit is advanced in stepwise fashion toward the right.

After the helical 7 is properly located, as explained later, a cut-off mechanism, indicated generally at 15 (FIGURES 2 and 5–8) is activated to sever the end portion 16 of the helical (FIGURES 7 and 8) so as to trim the projecting portion 12 to a predetermined length with respect to the border wire. The operating cycle, in the present example, is automatic and is initiated by depressing a treadle (not shown). The cut-off mechanism 15 is powered by an air cylinder, as disclosed in the parent application. The cut-off mechanism 15 coacts with the stationary locating head 13 to locate and clamp the helical, border wire and terminal securely in registry during the stretching and wrapping operations.

After having been trimmed to the proper length and clamped, a helical stretching mechanism, indicated generally at 17 (FIGURES 2, 3 and 10), engages the projecting end portion 12 and forces the end portion toward the right as viewed in FIGURE 2.

The stretching mechanism 17 is actuated by a second air cylinder (not shown), adjacent the air cylinder of the cut-off mechanism. The air cylinder of the stretching mechanism is activated automatically in sequence with the cut-off air cylinder so as to stretch the helical portion 12 after the helical trimming operation takes place. As best shown in FIGURES 9–12, the stretching mechanism 17 stretches a portion of the helical to the elongated shape indicated at 18, with the intact end portion 20 of the helical bent angularly from the stretched portion 18 and extending parallel with the main portion of the helical 7 but offset laterally therefrom.

By virtue of the stretching operation, the offset end portion 20 of the helical is located in a position to be engaged by the wrapping mechanism, which is indicated generally at 21 (FIGURES 2, 3, 9–12). The wrapping mechanism essentially comprises a wrapping gear 22 which engages the offset helical end portion 20 and which rotates and wraps the end portion 20 about the adjoining portions of the border wire 8 and terminal 10 (FIGURES 3 and 4). As best shown in FIGURES 10–12, the wrapping gear 22 includes a slot 23 which extends inwardly to the axis of rotation of the gear. The border wire 8 of the spring unit resides within the slot 23 at the axis of rotation of the gear 22 during the wrapping operation.

The slot 23 forms a throat to receive the border wire and the adjoining portion of the terminal, with the slot disposed in the horizontal position shown in FIGURE 10 at the start of the wrapping cycle. During the wrapping operation, the end portion 20 of the helical, which is engaged by the wrapping gear 22, is confined in the wrapping gear by a finger 24 (FIGURES 9 and 10), which forms part of the helical stretching mechanism 17.

In order to carry out the wrapping operation, the wrapping gear 22 is rotated through three complete revolutions in the same direction as the lead of the helical (FIGURES 11 and 12). The helical end portion 20, during rotation of the wrapping gear 22, is confined in a recess formed in the wrapping gear, as explained later. During rotation of the wrapping gear, the helical end portion 20 is simply moved in an orbit around the border wire 8 and terminal 10 and is successively wrapped as at 14 to tie the two portions (FIGURE 3).

As shown in FIGURE 3, the end helical portion 20 provides aprproximately two and one-half turns about the border wire and terminal, with the end 25 of the wrapped helical 14 located inwardly of the terminal 10. This is brought about by operation of the cut-off mechanism 15, which, in cooperation with the stretching mechanism and helical wrapper, controls the number of turns of the wrapped portion 14. Since the end 25 resides behind the terminal 10, the terminal conceals the end and prevents damage to the fabric covering which is later applied to the spring unit.

The wrapping gear is rotated by a gear head motor (not shown), which is connected to the wrapping gear through a driving system. At completion of the wrapping operation, a single cycle clutch disengages the motor and also applies air pressure to the air cylinders previously noted in a direction to lower the cut-off knife to the position of FIGURE 6 and to retract the stretching finger 24. When the cut-off knife is thus retracted, the spring unit 3 is released from the locating head 13, permitting the spring unit to be shifted to the right to bring the next helical into operating position.

In order to index the spring unit for the next operation, it is first shifted rearwardly so as to disengage the border wire and terminal from the slot 23 of the wrapping gear 22. For this purpose, the wrapping gear stops in the horizontal position shown in FIGURE 10 at the end of each cycle, as noted earlier. After having been disengaged from the wrapping gear, the spring unit is indexed to the right and then shifted forwardly to bring the border wire and terminal into operating position within the slot 23 of the gear, with the next helical positioned under the locating head 13, subsequently to be clamped in place at the start of the next wrapping cycle.

After all of the terminals have been joined to the border wire 8 (for example lower border wire 8 and lower terminals 10), the assembly is turned over and the upper terminals 10 are joined in the same manner to the upper border wire 8. After the upper and lower terminals are joined along one side, the spring assembly is rotated through an arc of 180° to bring the opposite side into operating relationship with the winding mechanism and the same operation is carried out with respect to the marginal terminals at top and bottom. In the present example, the marginal terminals at opposite ends of the spring assembly are connected to the tranverse border wires in the conventional manner, such as by threading on separate helicals about the end border wires and terminals.

It will be understood from the foregoing, that instead of acting upon the upper and lower border wires individually, it is also contemplated to mount two wrapping mechanisms, one above the other so as to act upon the upper and lower terminals and border wires concurrently, thereby substantially increasing the production of rate. In this event, both wrapping mechanisms are identical, both utilizing the same principle of operation.

Locating mechanism

As noted earlier (FIGURE 2), the locating mechanism comprises a stationary locating head 13 coacting with the cut-off mechanism 15, the two components being arranged to clamp the helical 7 in a fixed position while the cut-off mechanism 15 trims the projecting portion 12 of the helical to its proper length. After being trimmed, and while still clamped in the locating mechanism 13, the end portion 12 is stretched by the stretching mechanism 17, then the trimmed end is engaged by the wrapping mechanism and wound about the adjoining portions of the border wire 8 and terminal coil 10.

Referring to FIGURE 2, the locating head 13 is bolted as at 26 to the bed 2 of the machine and projects in cantilever fashion above the cut-off mechanism 15. The cut-off mechanism includes an arm 27 pivotally connected as at 28 to a block 30 which is also attached to the bed 2 for cooperation with the locating head 13. As noted earlier, the cut-off arm is reciprocated by the power cylinder (not shown) and normally resides in the lowered position.

After the spring unit 3 has been shifted to bring the helical 7 and its projecting end portion 12 in registry with the locating head, as explained earlier, the air cylinder is activated to shift the cut-off arm 27 upwardly. The cut-off arm includes a shiftable shearing blade 31 which coacts with a stationary shearing blade 32 carried by the locating head 13.

In order to locate and clamp the helical and the adjacent portions of the terminal and border wire, the swinging arm 27 is provided with locating pins, as explained below, which engage the helical 7, the border wire 8, and the terminal 10 in proper relationship with one another. The locating and clamping action takes place as the swinging arm 27 of the cut-off mechanism shifts upwardly to trim the helical and clamp it during upward motion of arm 27.

As shown in FIGURES 5 and 7, the swinging arm 27 of the cut-off mechanism includes five locating pins, indicated at 33, 34, 35, 36, and 37. The locating head 13 includes apertures 38, 40 and 41 and recess 42 (FIGURE 2), which register with the five locating pins, as described below. The pin 33 interfits the aperture 38, the pin 36 interfits the recess 42, the pins 34 and 35 interfit the aperture 40, and pin 37 interfits the aperture 41.

The swinging arm 27 also includes a coil locating block or anvil 43 (FIGURES 5 and 7) having upper edges which are inclined downwardly from the center toward the opposite sides of the block. The coil locating block or anvil 43 engages one of the terminals 10 so as to locate the terminal accurately with respect to the helical shearing and wrapping apparatus. The coil locating block or anvil is secured to one side of the arm 27 by screws.

As best shown in FIGURE 5, the pin 33 is provided with a downwardly tapered upper end 44 and is arranged to provide a camming action with respect to the helical 7 to locate the helical during upward motion of the swinging arm 27. The upper end of pin 34 includes a downwardly tapered portion 45 which provides a camming action with respect to the opposite side of helical 7 and also with respect to terminal 10. The pin 35 also includes a tapered upper end indicated at 46, engageable with the helical.

Accordingly, the straight portions 11 of adjoining coils, and the helical, which is laced about the straight portions, are clamped securely in position between the pin 33 at one side and the pins 34 and 35 at the opposite side. In addition, the terminals 10 of the loose coil spring is positioned by the locating block 43 with respect to the adjacent terminal, which previously has been joined by the helical to the border wire 8.

In addition to the pins 33, 34 and 35, pin 36 also includes an upper end which is tapered as at 47. Pin 36 locates the border wire 8 in relation to the terminal during upward motion of swinging arm 27. The upper end 48 of the fifth pin 37 is of conical configuration and also engages the border wire 8.

Briefly therefore, the pins 34–37 and the locating block or anvil 43 securely clamp the border wire the terminals and the helical wire in registry with the cut-off and wrapping mechanism when the arm 27 is shifted upwardly. It will also be understood that the shearing blade 31 of the cut-off mechansm trims the end portion 16 of the projecting helical 12 at about the same time that the locating pins engage and clamp the components of the spring unit. Subsequently, the parts are held in the clamped position during the stretching and wrapping operation, as explained below. The components of the spring unit are unclamped at the end of the cycle, permitting the spring unit to be shifted toward the right (FIGURE 2) to align the next helical 7 with respect to the trimming and wrapping mechanism.

*Cut-off mechanism*

As noted earlier, the cut-off mechanism 15, which is actuated by an air cylinder, carries out the first operation after the cycle is initiated by operation of a treadle (not shown). As soon as the treadle is depresesd, the cut-off arm 27, previously described, shifts upwardly from the position of FIGURE 6 to the position of FIGURE 8, causing the shearing blade 31 to sever the end helical portion 16 from the projecting helical portion 12, and concurrently to clamp the components of the spring unit 3.

The shearing blade 31 of cut-off arm 27 is seated in a cross groove (not shown) formed in the swinging portion of arm 27. The blade 31 is clamped in place by a retainer bar (not shown) which is secured in place by screws. As noted earlier, the blade 31 is actuated by an air cylinder (not shown).

It will be understood that during the initial portion of the cycle, the cut-off mechanism 15 severs the helical end portion 16 (FIGURES 6 and 8) immediately after the treadle is depressed so as to reduce the projecting portion 12 of the helical to a uniform length, thereby to provide the required number of turns to be wrapped about the terminal and border wire. The cut-off mechanism, as noted above, also coacts with the locating head 13 to clamp the helical, terminal and border wire firmly in place during the subsequent stretching and wrapping operations, as explained below.

*Helical stretching mechanism*

As best shown in FIGURE 2, the stretching mechanism 17 comprises an arm 50 pivotally mounted upon a shaft 51 carried by several bearing brackets, one of which is indicated at 52 in FIGURE 2. The bracket 52 and companion brackets (not shown) form a part of the locating head 13. The stretching finger, previously indicated at 24, is attached to a yoke 53 which is pivotally mounted upon the pivot shaft 51. The actuating arm 50 is rigidly attached to the opposite end of yoke 53. Rocking motion is imparted to the arm 50 by the air cylinder. It will be understood at this point, that energization of the air cylinder shifts the stretching finger 24 from a retracted position to a stretching position (FIGURE 10).

As noted earlier, the stretching cylinder is energized after the energization of the cut-off cylinder, the sequence being regulated by the control apparatus of the machine in sequence in response to operation of the treadle. As best shown in FIGURE 10, the stretching finger 24 engages the end portion 12 of the helical and shifts it laterally (to the left as viewed in FIGURE 10, and to the right as viewed from the front of the machine—FIGURE 2). In stretching the helical, the finger 24 forms the stretched portion, previously indicated at 18, and bends the helical end portion 20 at right angles to the stretched position in position to be engaged by the wrapping gear 22. It will be noted in FIGURES 9 and 10 that the helical end 20 is disposed substantially in parallelism with the main helical 7 in a position to be engaged by the wrapping gear 22 during the next portion of the cycle.

*Wrapping mechanism*

Upon completion of the stretching operation (stretching mechanism 17), the control system activates the wrapping mechanism, previously indicated at 21, which includes the wrapping gear 22. As best shown in FIGURES 10–12, the wrapping gear 22, on opposite sides, includes hubs 54 and 55. The hubs 54 and 55 are journalled in a bearing assembly, indicated at 56, which supports the wrapping gear 22 for rotary motion.

As noted earlier, the wrapping gear 22 (FIGURE 10) is provided with an open slot or throat 23 which resides in a horizontal position at the start of the wrapping operation. As shown in this view, the border wire 8 and a portion of the terminal 10 reside in slot 23 at the axis of rotation of wrapping gear 22 during the locating cut-off and stretching operations. After these operations are carried out, the driving system rotates the wrapping gear 22 through three complete revolutions to carry out the wrapping operation. At the end of the cycle, the gear is stopped with the slot 23 in the horizontal position (FIGURE 10) to permit the spring unit 3 to be withdrawn from the slot and indexed for the next cycle of operation.

As best shown in FIGURES 10–12, the hub 55 of the wrapping gear 22 includes a lug 57 projecting outwardly, with a semi-circular recess 58 formed at the leading edge of the lug 57 in the direction of rotation of the wrapping gear 22, as indicated by the arrow 60. The face 61 of hub 55 further includes an arcuate channel 62 leading to the recess 58. The arcuate channel 62 aids in leading the helical end portion 20 into the recess 58 during rotation of the wrapping gear.

At the start of the wrapping operation, the offset helical end portion 20 of the helical rests against the face 61 of hub 55 and is confined in this position by the stretching finger 24 for the wrapping operation (FIGURES 10 and 11). As the wrapping gear 22 begins to rotate (FIGURE 12) in the direction indicated, the helical end portion 20 is engaged in the arcuate recess 58 and is forced in an orbit about the border wire 8 and adjacent terminal portion 10 during the three revolutions of the wrapping gear.

The inner end of the semi-circular recess 58 is delineated by a ledge or end wall 63, as best shown in FIGURE 11. It will be noted in this view, that the helical 20, passes across the ledge 63 and into the recess 58 during rotation of the wrapping gear. The ledge 63 applies a frictional drag with respect to the helical end portion 20, thereby creating a pulling force with respect to the stretched portion 18. By virtue of the frictional pull thus provided, the turns of the helical end portion 20 are drawn tightly about the border wire and terminal, thereby to securely bind the terminal 10 to the border wire 8 (FIGURES 3 and 4). It will be understood that this action causes the helical end portion to rotate within the recess 58 as it is unwound and wrapped. As noted earlier, the end 25 of the tie 14 (FIGURES 3 and 4) is concealed behind the terminal in order to protect the fabric which subsequently is applied over the spring unit.

The bearing assembly 56, which rotatably supports the wrapping gear 22, comprises a pair of side plates 64 and 65 spaced apart from one another by a spacer block 66. The side plates 64 and 65 are clamped against the spacer block and bearing plate by bolts 67. The side plate 65 includes a bore providing a bearing for the hub 55.

The side plates 64 and 65 are slotted horizontally and in registry with the slot 23 of wrapping gear 22; the spacer block 67 is similarly slotted to receive the border wire and terminal. The border wire and terminal are positively confined at the axis of gear 22 during rotary motion of the gear. To aid in positioning the border wire and terminal in the wrapping gear at the start of the cycle, the slot 23 of gear 22 and the ends of the side plates are flaired to provide a receiving throat.

As viewed in FIGURE 2, the bearing assembly 56 is mounted upon the bed 3 by means of a bolt 68. Bolt 68 passes through a clamping block 70 which is seated upon the upper edges of the side plates 65 and 66, with the lower end of bolt 68 threaded into the bed 2. Additional locating means, such as dowel pins or the like (not shown) pass from the bed into the bearing assembly to complete the mounting.

Rotary motion is imparted to the wrapping gear 22 during the wrapping cycle by operations of a driving system, as disclosed in the parent application Serial No. 339,638.

Having described our invention we claim:

1. The method of assembling a coil spring unit having rows of vertically disposed coil springs, each row of coil springs including terminals adjoining one another, said spring unit having a border wire extending about the periphery of the spring unit in adjoining relationship to the terminals of the marginal coil springs, said method comprising:

placing said coil springs in adjacent parallel rows extending across the spring unit, with the terminals of said coil springs in adjoining relationship to one another, and with the terminals of the marginal coil springs in adjoining relationship with the said border wire;

threading respective helicals about the terminals of the rows of coil springs, thereby joining said rows of terminals to one another, with an end portion of each helical projecting beyond the border wire at opposite sides of the spring unit;

wrapping the projecting end portion of each helical about the marginal terminals and border wire of the spring unit;

and tightening the wrapped portion of the helical to provide a clamping engagement between the adjoining portions of the border wire and terminal, thereby to secure the marginal terminals to the border wire and to lock the helical against longitudinal displacement with respect to the spring unit.

2. The method of assembling a coil spring unit having rows of vertically disposed coil springs, each row of coil springs including terminals adjoining one another, said spring unit having a border wire extending about the periphery of the spring unit in adjoining relationship to the terminals of the marginal coil springs, said method comprising:

placing said coil springs in adjacent rows extending across the spring unit, with the terminals of said coil springs in adjoining relationship to one another, and with the terminals of the marginal coil springs in adjoining relationship with the said border wire;

threading respective helicals in corkscrew fashion about the terminals of the adjoining rows of coil springs, thereby joining said rows of terminals to one another, with an end portion of each helical projecting beyond the border wire at opposite sides of the spring unit;

stretching the end portion of each helical, which projects beyond the border wire, to provide a substantially straight wire section;

bending said stretched, substantially straight wire section, to a position substantially parallel with the border wire;

and wrapping the end portion of said stretched straight wire section under tension about the terminal of each marginal coil spring and the adjoining portion of the border wire, thereby to secure the terminal to the border wire and to prevent longitudinal displacement of the helical.

3. The method of assembling a coil spring unit having rows of vertically disposed coil springs, each row of coil springs including terminals adjoining one another, said spring unit having a border wire extending about the periphery of the spring unit in adjoining relationship to the terminals of the marginal coil springs, said method comprising:

placing said coil springs in adjacent rows extending across the spring unit, with the terminals of said coil springs in adjoining relationship to one another, and with the terminals of the marginal coil springs in adjoining relationship with the said border wire;

threading respective helicals in corkscrew fashion about the terminals of the adjoining rows of coil springs, thereby joining said rows of terminals to one another, with an end portion of each helical projecting beyond the border wire at opposite sides of the spring unit;

trimming the projecting end portion of the helical to a predetermined length after the helical is threaded in corkscrew fashion across the spring unit;

wrapping the projecting end portion of each helical, after the trimming operation, about the terminal of each marginal coil spring and the border wire of the spring unit;

and tightening the trimmed and wrapped portion of the helical to provide a clamping engagement between the adjoining portion of the border wire and terminal, thereby to secure the marginal terminals to the border wire and to lock each helical against longitudinal displacement with respect to the spring unit.

4. The method of assembling a coil spring unit having rows of vertically disposed coil springs, each row of coil springs including terminals adjoining one another, said spring unit having a border wire extending about the periphery of the spring unit in adjoining relationship to the terminals of the marginal coil springs, said method comprising:

placing said coil springs in adjacent rows extending across the spring unit, with the terminals of said coil springs in adjoining relationship to one another, and with the terminals of the marginal coil springs in adjoining relationship with the said border wire;

threading respective helicals in corkscrew fashion about the terminals of the adjoining rows of coil springs, thereby joining said rows of terminals to one another, with an end portion of each helical projecting beyond the border wire at opposite sides of the spring unit;

trimming the projecting end portion of the helical to a predetermined length after the helical is threaded in corkscrew fashion across the spring unit;

stretching the end portion of the helical to a substantially straight condition after the said trimming operation;

bending said stretched, substantially straight portion of the helical generally at right angles to a position substantially parallel with the border wire;

wrapping the projecting end portion of the helical, after the trimming and bending operation, about the marginal terminal and border wire of the spring unit, thereby to tie the terminal to the border wire; and tightening the trimmed and wrapped portion of the helical to provide a clamping engagement between the adjoining portion of the border wire and terminal, thereby to secure the marginal terminal to the border wire and to lock the helical against longitudinal displacement with respect to the spring unit.

References Cited

UNITED STATES PATENTS

| 2,161,689 | 6/1939 | Standberg | 140—92.3 |
| 2,925,099 | 2/1960 | Bergstrom | 140—92.7 |
| 3,122,177 | 2/1964 | Kamp | 140—92.7 |
| 3,182,689 | 5/1965 | Hulme et al. | 140—92.3 |

RICHARD J. HERBST, *Primary Examiner.*

L. A. LARSON, *Assistant Examiner.*